United States Patent [19]

Watanabe

[11] Patent Number: 5,066,902
[45] Date of Patent: Nov. 19, 1991

[54] AUTOMATIC NOMINAL DATA SETTING METHOD IN A VISUAL SENSOR SYSTEM

[75] Inventor: Atsushi Watanabe, Oshimo, Japan

[73] Assignee: Fanuc Ltd, Minamitsuru, Japan

[21] Appl. No.: 465,108

[22] PCT Filed: Jun. 30, 1989

[86] PCT No.: PCT/JP89/00661
§ 371 Date: Feb. 20, 1990
§ 102(e) Date: Feb. 20, 1990

[87] PCT Pub. No.: WO90/00109
PCT Pub. Date: Jan. 11, 1990

[30] Foreign Application Priority Data

Jul. 1, 1988 [JP] Japan .................. 63-162657

[51] Int. Cl.⁵ ................ G05B 19/18; G06F 15/46
[52] U.S. Cl. .................. 318/568.16; 318/568.1; 901/3; 395/1
[58] Field of Search ........... 318/568.1, 568.13, 568.14, 318/568.16, 568.19, 568.23, 568.25, 567; 364/513; 901/3, 19, 47

[56] References Cited

U.S. PATENT DOCUMENTS 4,517,653  5/1985  Tsuchihashi et al. .................. 901/3
4,613,943  9/1986  Miyake et al. ...................... 364/513
4,707,647 11/1987  Coldren et al. ..................... 364/478
4,757,459  7/1988  Lauchnor et al. .................... 901/3

Primary Examiner—William M. Shoop, Jr.
Assistant Examiner—Larry Moskowitz
Attorney, Agent, or Firm—Staas & Halsey

[57] ABSTRACT

An automatic nominal data setting method in a visual sensor system is capable of accurately and rapidly setting nominal data with ease, and a correction data deriving method is executable on the basis of the automatically set nominal data. If operation of the visual sensor system in a nominal mode is determined (S200) upon start of execution of an orientation portion of a user program by the visual sensor system mounted on an industrial robot, a message for interrogating whether or not nominal data setting should be executed is displayed (S201). When an operator inputs a nominal data setting command (S202), the workpiece position/posture data in the sensor coordinate system at that time, determined based on gray-scale image data, is converted into workpiece position/posture data in the robot coordinate system to be stored as nominal data (S203). During a robot operation, the visual sensor system calculates correction data for correction of the operating position/posture of the robot on the basis of workpiece position/posture data created similarly and the nominal data, and supplies same to the robot.

4 Claims, 2 Drawing Sheets

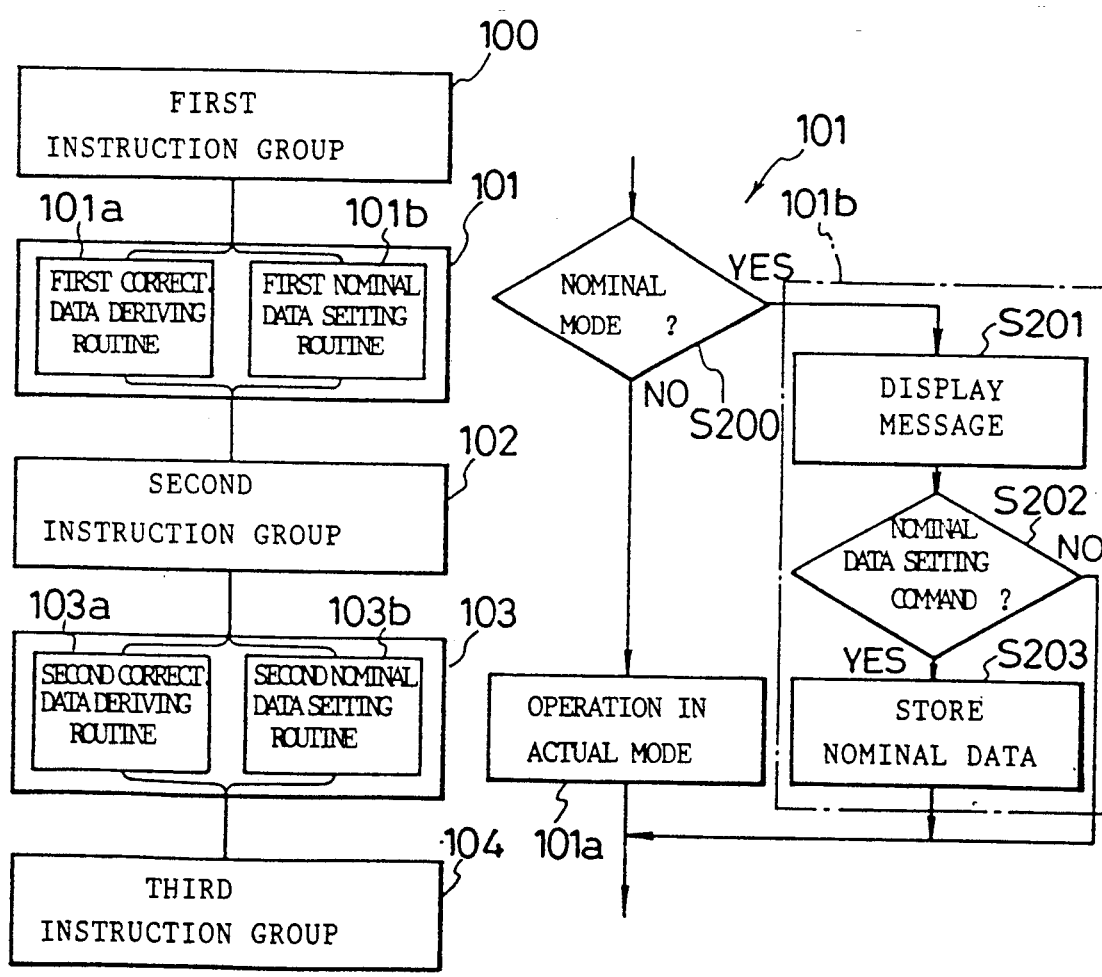

AUTOMATIC NOMINAL DATA SETTING METHOD IN A VISUAL SENSOR SYSTEM

BACKGROUND OF THE INVENTION

1. Field of the Invention

The present invention relates to an automatic nominal data setting method and a correction data deriving method in a visual sensor system.

2. Description of the Related Art

In various machines such as industrial robots, it is conventionally known to correct the position and posture of operating sections of the machine in accordance with correction data supplied from a visual sensor system which is mounted on the machine. In operating the robot, for instance, the visual sensor system detects the operating position and posture of the robot, and supplies detection data to a control section of the robot. The control section determines correction data on the basis of the detection data and reference data (hereinafter, referred to as nominal data) such as data indicative of the operating position and posture of the robot which are set beforehand when teaching to the robot is effected, and corrects the operating position and posture of the robot. Conventionally, the nominal data for correction of operation is manually set beforehand by an operator. Therefore, the nominal data setting is troublesome and must be carried out by a skilled person.

SUMMARY OF THE INVENTION

An object of the present invention is to provide an automatic nominal data setting method in a visual sensor system which makes it possible to accurately and rapidly set the nominal data with ease.

Another object of the present invention is to provide a correction data deriving method in a visual sensor system which is executable on the basis of the automatically set nominal data.

In order to achieve the above object, according to the present invention, the automatic nominal data setting method in a visual sensor comprises steps of: (a) operating the visual sensor system to execute a program provided at its predetermined portion with a predetermined routine for nominal data setting; (b) detecting a value of a predetermined image parameter associated with the nominal data; and automatically setting, as the nominal data, the predetermined image parameter value which is detected at the time of executing the predetermined routine.

According to another aspect of the present invention, the correction data deriving method in the visual sensor system comprises steps of: (a) operating the visual sensor system to execute a program provided, in pairs, at its predetermined portion with first and second predetermined routines respectively for nominal data setting and correction data deriving; (b) detecting a value of a predetermined image parameter associated with the nominal data; (c) selecting one of a nominal mode where the program is executed with the first predetermined routine included and the second predetermined routine excluded and an actual mode where the program is executed with the first predetermined routine excluded and the second predetermined routine included; (d) automatically setting, as the nominal data, the predetermined image parameter value which is detected at the time of executing the first predetermined routine in the nominal mode; and (e) deriving correction data on the basis of the nominal data and the predetermined image parameter value which is detected at the time of executing the second predetermined routine in the actual mode.

As described above, according to the present invention, since the value of the image parameter, associated with the nominal data, which is detected at the time of executing the predetermined routine provided in the predetermined portion of the program, is automatically set as the nominal data, the nominal data setting in the visual sensor system can be accurately and rapidly effected with ease. Further, since the data for correction of operation of various machines is derived on the basis of the automatically set nominal data, the operation correction can be effected in an appropriate manner.

BRIEF DESCRIPTION OF THE DRAWINGS

FIG. 2 is a block diagram representation of a program showing, by way of example, a program executed by the visual sensor system of FIG. 1; and FIG. 3 is a flowchart exemplarily showing a nominal data setting routine.

DESCRIPTION OF THE PREFERRED EMBODIMENT

Figure 1:
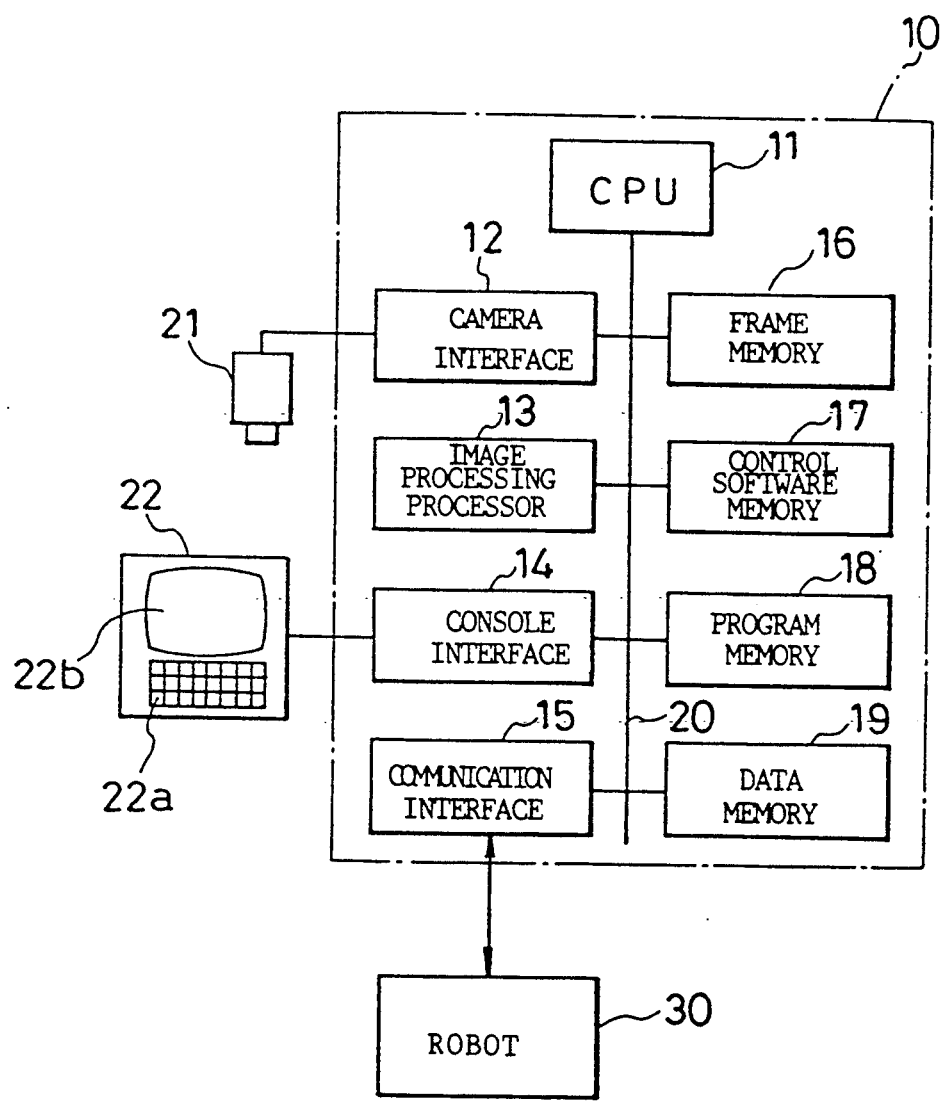
FIG. 1 is a block diagram showing an essential part of a visual sensor system for effecting the automatic nominal data setting method and correction data deriving method according to an embodiment of the present invention.

A visual sensor system for embodying a method of an embodiment of the present invention is mounted on an industrial robot, for instance, and is arranged to supply robot operation correction data to the robot. To this end, the visual sensor system is so designed as to be operated in a nominal mode where nominal data (for example, reference data indicative of the position and posture of a specified part of a workpiece when teaching to the robot is performed) for correction data derivation is automatically detected to be stored, and in an actual mode where the correction data is derived to be supplied to the robot.

Referring to FIG. 1, the visual sensor system is provided with an image processing device 10 having a main central processing unit (hereinafter, referred to as a main CPU) 11. A camera interface 12, image processing processor 13, console interface 14, communication interface 15, frame memory 16, control software memory 17, program memory 18 and data memory 19 are connected to the main CPU 11 via a bus 20. A camera 21, mounted on an operating section (not shown) of a robot 30 so as to be moved together with the operating section, for instance, and a second camera, not shown, are connected to the camera interface 12. A console 22 is connected to the console interface 14. Further, a control section of a machine on which the visual sensor system is to be mounted, for example, a control section (not shown) of the robot 30, is connected to the communication interface 15.

More specifically, the console 22 includes various keys 22a, including numeral keys, for selection of the operating modes of the visual sensor system, input of various instructions, and input, editing, registration and execution of programs. The console also includes a liquid crystal display unit 22b for displaying various operation menus, program lists and the like. The control software memory 17, formed of a ROM, is arranged to store visual sensor system controlling programs, and the program memory 18, formed of a RAM, is arranged to store a user program for setting nominal data and deriving correction data. The user program is created by an operator by operating the keys 22a of the console 22 in accordance with the menu displayed on the display unit 22b of the console 22. Routines respectively for nominal data setting and correction data deriving are provided in pairs in a predetermined portion of the program. For example, as shown in FIG. 2, a first correction data deriving routine 101a and a first nominal data setting routine 101b are provided as a pair in a first orientation portion 101 of the user program lying between first and second instruction groups 100 and 102 of the user program. Further, second correction data deriving routine 103a and a second nominal data setting routine 103b are provided as a pair in a second orientation portion 103 lying between the second and third instruction groups 102 and 104. An example of a user program is shown below.

| | |
|---|---|
| SNAP | |
| CIRCLE | FIND |
| RECOG | OBJECT |
| CONV | DATA |
| SNAP | |
| CIRCLE | FIND |
| RECOG | OBJECT |
| CONV | DATA |
| SEND | DATA |

The operation of the visual sensor system with the above construction will be explained with reference to FIG. 3. When the operator operates a predetermined key of the console 22 to input a nominal mode selection command or an actual mode selection command to the visual sensor system, the main CPU 11 of the image processing device 10 in the visual sensor system responds to the command, so that a flag memory (not shown) contained in the CPU stores flag information representing the selected operation mode of the visual sensor system. During the teaching operation for the robot 30 effected by the operator or the actual operation of the robot performed in accordance with the teaching program stored in a memory section (not shown) of the robot 30, the main CPU 11 is operated in accordance with the sensor system controlling program stored in the control software memory 17.

In relation to the present invention, the CPU 11 executes the user program (FIG. 2), including nominal data setting/correction data deriving, which is read out from the program memory 18. When a snap command is read out from the first instruction group 100 of the program, a video signal supplied from the camera 21 is subjected to various processings which are known in the art, so that gray-scale image data, consisting of a predetermined number of picture elements each represented by a predetermined number of bits, are created, and then stored in the frame memory 16. Next, the gray-scale image data is image-processed in the image processing processor 13 in a well-known manner. As a result, a workpiece (not shown), which is an object to be processed by the robot 30 and photographed by the camera 21, is recognized, and data representing the position and posture (image parameter) of the workpiece in the sensor coordinate system is created.

Next, the first orientation portion 101 of the user program is executed. At this time, the main CPU 11 determines which one of the nominal mode and actual mode is selected on the basis of the flag information (step S200 in FIG. 3). When the nominal mode is selected (in other words, during the teaching operation of the robot 30), the main CPU 11 executes the first nominal data setting routine 101b. At first, the CPU causes the liquid crystal display unit 22b of the console 22 to display an interrogation message "Nominal data setting required?" (step S201), and determines whether or not the operator operates a predetermined key of the console 22 so as to input the nominal data setting command in response to the message (step S202). When the command is input, the main CPU 11 translates the workpiece position and posture data in the sensor coordinate system using a coordinate conversion process to obtain the workpiece position and posture data in the robot coordinate system, and causes the data memory 19 to store the same as nominal data (step S203). As a result of the provision of the message display step S201, the setting command input determination step S202 and the nominal data setting step S203, the operator is enabled to prevent nominal data from being stored when he determines that it is not necessary to set that particular nominal data.

Meanwhile, the operating position and posture of the robot 30 obtained at the time of input of the nominal data setting command are instructed to the robot.

Next, the main CPU 11 executes the second instruction group 102 corresponding to the first instruction group 100. That is, an image is derived from the second camera and subjected to image processing to recognize the object. Then, the same processing as described above is effected with respect to the second orientation portion 103 following the second instruction group, and further executes the third instruction group 104 so as to supply the first and second correction data to the robot 30, for instance. operation in the nominal mode is completed when it is determined at step S202 that the nominal data setting command is not input.

On the other hand, during the actual operation of the robot 30, that is, during the operation in the actual mode of the visual sensor system, the main CPU 11 of the visual sensor system executes the user program of FIG. 2 in the same manner as in the above-described case. However, when the execution of the first orientation portion 101 of the user program following the first instruction group 100 thereof is started, the main CPU 11 determines, on the basis of the flag information at the step S200, that the actual mode is selected, and executes the correction data deriving routine 101a. In the deriving routine 101a, the main CPU 11 calculates, as incremental correction data, a difference between data representing the workpiece position and posture in the robot coordinate system obtained by the same proceedings as described above and the nominal data obtained in the preceding nominal mode. Next, the incremental correction data is supplied to the control section of the robot via the communication interface 15. The robot control section controls the position and posture of the operating sections of the robot in a conventional manner while effecting the conventional correcting operation of the operating position/posture in accordance with the incremental correction data, to thereby perform required operations.

What is claimed is:

1. An automatic nominal data setting method in a visual sensor system, comprising the steps of:

(a) operating the visual sensor system to execute a program including a predetermined routine for obtaining nominal data;

(b) automatically detecting a value of a predetermined image parameter associated with the nominal data during execution of the predetermined routine while said operating is performed in step (a); and (c) automatically storing, as the nominal data, the value of the predetermined image parameter detected in step (b), by executing the predetermined routine.

2. An automatic nominal data setting method in the visual sensor system according to claim 1, further comprising the steps of:

(d) displaying a message for interrogating whether said storing of the nominal data in step (c) should be executed; and (e) determining whether a nominal data setting command was input by an operator in response to said displaying of the message in step (d), and wherein said storing of the nominal data in step (c) is executed only when it is determined in step (e) that the nominal data setting command was input by the operator in response to said displaying of the message in step (d).

3. A correction data deriving method in a visual sensor system, comprising the steps of:

(a) operating the visual sensor system to execute a program including at least one orientation portion with first and second predetermined routines respectively for storing nominal data and deriving correction data;

(b) automatically detecting a value of a predetermined image parameter associated with the nominal data during operation of the program in step (a);

(c) selecting one of a nominal mode where said operating of the program in step (a) includes executing the first predetermined routine, but not the second predetermined routine, and an actual mode where said operating of the program includes executing the second predetermined routine, but not the first predetermined routine;

(d) automatically storing, as the nominal data, the value of the predetermined image parameter detected during execution of the first predetermined routine in said operating of the program in the nominal mode; and (e) automatically deriving correction data from the nominal data and the value of the predetermined image parameter detected during execution of the second predetermined routine in said operating of the program in the actual mode.

4. A correction data deriving method in the visual sensor system according to claim 3, further comprising the steps of:

(f) displaying a message for interrogating whether storing of the nominal data in step (d) should be executed; and (g) determining whether a nominal data setting command was input by an operator in response to said displaying of the message in step (f), and wherein said storing of the nominal data in step (d) is executed only when it is determined in step (g) that the nominal data setting command was input by the operator in response to said displaying of the message in step (f).

* * * * *